United States Patent
Celik (10) Patent No.: US 9,431,938 B2
(45) Date of Patent: Aug. 30, 2016

(54) METHOD OF CONTROLLING A BRUSHLESS PERMANENT-MAGNET MOTOR

(71) Applicant: Dyson Technology Limited, Wiltshire (GB)

(72) Inventor: Tuncay Celik, Swindon (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

(21) Appl. No.: 14/304,511

(22) Filed: Jun. 13, 2014

(65) Prior Publication Data

US 2014/0368140 A1    Dec. 18, 2014

(30) Foreign Application Priority Data

Jun. 13, 2013 (GB) .................... 1310572.1
Jun. 13, 2013 (GB) .................... 1310574.7

(51) Int. Cl.
| | |
|---|---|
| H03K 5/00 | (2006.01) |
| H02P 6/14 | (2016.01) |
| H02P 6/08 | (2016.01) |

(52) U.S. Cl.
CPC ............... *H02P 6/147* (2013.01); *H02P 6/085* (2013.01)

(58) Field of Classification Search
CPC ........ H02P 6/182; H02P 6/142; H02P 6/002; H02P 2207/05; H02P 6/147; H02P 6/145
See application file for complete search history.

(56) References Cited

U.S. PATENT DOCUMENTS

| | | | | |
|---|---|---|---|---|
| 5,233,275 | A | * | 8/1993 | Danino .................. H02P 6/182 318/400.11 |
| 5,506,487 | A | | 4/1996 | Young et al. |
| 6,034,493 | A | * | 3/2000 | Boyd ..................... H02P 6/002 318/400.31 |
| 8,474,095 | B2 | | 7/2013 | Clothier et al. |
| 8,836,254 | B2 | | 9/2014 | Dai et al. |
| 8,841,876 | B2 | | 9/2014 | Leaver et al. |
| 2001/0040438 | A1 | * | 11/2001 | Maurice ................. H02P 6/142 318/400.35 |
| 2005/0069301 | A1 | | 3/2005 | Gallagher et al. |
| 2008/0048593 | A1 | | 2/2008 | Takeuchi |
| 2010/0164418 | A1 | | 7/2010 | Higuchi |
| 2010/0188037 | A1 | * | 7/2010 | Acquaviva ............. H02P 1/465 318/721 |
| 2010/0251509 | A1 | | 10/2010 | Clothier |
| 2011/0257791 | A1 | | 10/2011 | Hawker et al. |
| 2012/0081046 | A1 | | 4/2012 | Dai et al. |
| 2013/0127384 | A1 | | 5/2013 | Dai et al. |
| 2013/0234640 | A1 | | 9/2013 | Bateman |
| 2014/0368138 | A1 | | 12/2014 | Celik et al. |
| 2014/0368141 | A1 | | 12/2014 | Zheng et al. |

FOREIGN PATENT DOCUMENTS

| | | |
|---|---|---|
| EP | 1 555 738 | 7/2005 |
| EP | 2 302 785 | 3/2011 |

(Continued)

OTHER PUBLICATIONS

Search Report mailed Nov. 15, 2013, directed towards GB Application No. 1310574.7; 1 page.

(Continued)

*Primary Examiner* — Karen Masih
(74) *Attorney, Agent, or Firm* — Morrison & Foerster LLP (57) ABSTRACT

A method of controlling a brushless permanent-magnet motor. The method includes commutating a winding of the motor at times that are retarded relative to zero-crossings of back EMF in the winding.

24 Claims, 6 Drawing Sheets

(56) References Cited

FOREIGN PATENT DOCUMENTS

| | | |
|---|---|---|
| GB | 2469138 | 10/2010 |
| GB | 2484779 | 4/2012 |
| GB | 2496867 | 5/2013 |
| GB | 2500013 | 9/2013 |
| JP | 7-322636 | 12/1995 |
| JP | 2002-112577 | 4/2002 |
| JP | 2004-304905 | 10/2004 |
| JP | 2005-143225 | 6/2005 |
| JP | 2010-246385 | 10/2010 |
| JP | 2010-246386 | 10/2010 |
| JP | 2012-80766 | 4/2012 |
| JP | 2012-80768 | 4/2012 |
| WO | WO-00/22723 | 4/2000 |

OTHER PUBLICATIONS

Search Report mailed Dec. 6, 2013, directed towards GB Application No. 1310572.1; 1 page.
Zheng et al., U.S. Office Action mailed Nov. 12, 2015, directed to U.S. Appl. No. 14/304,599; 6 pages.
Celik et al., U.S. Office Action mailed Oct. 22, 2015, directed to U.S. Appl. No. 14/304,658; 6 pages.

* cited by examiner

| Control Signals | | | | Power Switches | | | | Inverter Condition |
|---|---|---|---|---|---|---|---|---|
| S1 | S2 | S3 | S4 | Q1 | Q2 | Q3 | Q4 | |
| 0 | 0 | 0 | 0 | 0 | 0 | 0 | 0 | Off |
| 1 | 0 | 0 | 1 | 1 | 0 | 0 | 1 | Excite Left-to-Right |
| 0 | 1 | 1 | 0 | 0 | 1 | 1 | 0 | Excite Right-to-Left |
| 0 | 1 | 0 | 1 | 0 | 1 | 0 | 1 | Freewheel |

METHOD OF CONTROLLING A BRUSHLESS PERMANENT-MAGNET MOTOR

REFERENCE TO RELATED APPLICATION

This application claims priority of United Kingdom Application Nos. 1310574.7 and 1310572.1, filed Jun. 13, 2013, the entire contents of which are incorporated herein by reference.

FIELD OF THE INVENTION

The present invention relates to a method of controlling a brushless permanent-magnet motor.

BACKGROUND OF THE INVENTION

There is a growing need to improve the efficiency of brushless permanent-magnet motors.

SUMMARY OF THE INVENTION

The present invention provides a method of controlling a brushless permanent-magnet motor, the method comprising commutating a winding of the motor at times that are retarded relative to zero-crossings of back EMF in the winding when operating at speeds greater than 50 krpm.

At speeds greater than 50 krpm, the length of each electrical half-cycle is relatively short and the magnitude of the back EMF is relatively large. Both of these factors would suggest that advanced commutation is necessary in order to drive sufficient current and thus power into the phase winding in order to maintain such speeds. However, the applicant has identified that, once the motor is at this speed, improvements in the efficiency of the motor may be achieved by retarding commutation. For a permanent-magnet motor, the torque-to-current ratio is at a maximum when the waveform of the phase current matches that of the back EMF. Improvements in the efficiency of the motor are therefore achieved by shaping the waveform of the phase current such that it better matches the waveform of the back EMF. In instances for which the phase current rises faster than the back EMF at around zero-crossings in the back EMF, advanced commutation would cause the phase current to quickly lead the back EMF. By retarding commutation until after each zero-crossing in the back EMF, the rise in the phase current may be made to more closely follow that of the back EMF. As a result, the efficiency of the motor may be improved.

The method may comprise commutating the winding at times that are retarded relative to zero-crossings of back EMF when operating over a speed range spanning at least 5 krpm, and more preferably at least 10 krpm. As a result, improvements in the efficiency of the motor may be achieved over a relatively large range of speeds.

Changes in the magnitude of the supply voltage used to excite the winding will influence the rate at which the phase current rises. Changes in the speed of the motor will influence the length of each electrical half-cycle and thus the rate at which the back EMF rises. Additionally, changes in the speed of the motor will influence the magnitude of the back EMF and thus the rate at which the phase current rises. Accordingly, the method may comprise retarding commutation by a retard period and varying the retard period in response to changes in the supply voltage and/or the speed of the motor. This then has the advantage that the efficiency of the motor may be improved as the motor operates over a range of supply voltages and/or motor speeds. Additionally, the amount of current and thus power that is driven into the winding is sensitive to changes in the supply voltage and/or the motor speed. By varying the retard period in response to changes in the supply voltage and/or motor speed, better control may be achieved over the input or output power of the motor.

The method may comprise increasing the retard period in response to an increase in the supply voltage and/or a decrease in the motor speed. As the magnitude of the supply voltage increases, the phase current rises at a faster rate. As the speed of the motor decreases, the back EMF rises at a slower rate. Additionally, the magnitude of the back EMF decreases and thus the phase current rises at a faster rate. By increasing the retard period in response to an increase in the supply voltage and/or a decrease in the motor speed, the waveform of the phase current may be made to better match that of the back EMF in response to changes in the supply voltage and/or the motor speed. As a result, the efficiency of the motor may be improved when operating over a range of supply voltages and/or speeds.

The method may comprise dividing each electrical half-cycle into a conduction period followed by a freewheel period. The winding is then excited during the conduction period and freewheeled during the freewheel period. Moreover, the method may comprise dividing the conduction period into a first excitation period, a further freewheel period and a second excitation period, and the winding may be excited during each excitation period and the winding may be freewheeled during the further freewheel period. Although commutation is retarded, the phase current may nevertheless rise at a faster rate than that of the back EMF. As a result, the phase current may eventually lead the back EMF. The secondary freewheel period serves to check momentarily the rise in the phase current. Consequently, the phase current may be made to more closely follow the rise of the back EMF during the conduction period, thereby improving the efficiency.

The method may comprise commutating the winding at times that are retarded relative to zero-crossings of back EMF when operating over a first speed range, commutating the winding at times that are advanced relative to zero-crossings of back EMF in the winding when operating over a second speed range, and the second speed range is higher than the first speed range. When operating over the first speed range, the phase current rises at a faster rate than that of the back EMF at around zero-crossings. Accordingly, by retarding commutation, improvements in the efficiency of the motor may be achieved. When operating over the second speed range, the length of each electrical half-cycle is shorter and thus the back EMF rises at a faster rate. Additionally, the magnitude of the back EMF is higher and thus the phase current rises at a slower rate. The back EMF therefore rises at a faster rate but the phase current rises at a slower rate. As a result, the phase current rises at a slower rate than that of the back EMF. Retarding commutation would then only serve to worsen the efficiency of the motor. Moreover, it may not be possible to drive sufficient current and power into the winding when operating over the second speed range if commutation is retarded. Accordingly, by employing retarded commutation over the first speed range and advanced commutation over the second speed range, the efficiency of the motor may be improved over both speed ranges.

The method may comprise dividing each electrical half-cycle of the motor into a conduction period followed by a freewheel period when operating over the first speed range and the second speed range, the winding being excited during the conduction period and freewheeled during the freewheel period.

The method may comprise driving the motor at constant power (be it input power or output power) over the first speed range and the second speed range. The power of the motor over the first speed range is then lower than that over the second speed range.

The method may comprise retarding commutation by a retard period when the motor operates over the first speed range, and advancing commutation by an advance period when the motor operates over the second speed range. Constant power may then be achieved by varying the retard period and the advance period in response to changes in the speed of the motor. Additionally or alternatively, constant power may be achieved by varying the length of the conduction period in response to changes in the speed of the motor.

The first speed range and the second speed range may each span at least 5 krpm, and more preferably at least 10 krpm. As a result, improvements in the efficiency of the motor may be achieved over relatively large speed ranges.

The present invention also provides a control circuit configured to perform a method described in any one of the preceding paragraphs, as well as a motor assembly that comprises the control circuit and a brushless permanent-magnet motor.

The control circuit may comprise an inverter for coupling to a winding of the motor, a gate driver module and a controller. The gate driver module then controls switches of the inverter in response to control signals received from the controller, and the controller generates control signals to commutate the winding. More particularly, the controller generates control signals to commutate the winding at times that are retarded relative to zero-crossings of back EMF in the winding when the speed of the motor is greater than 50 krpm.

The present invention further provides a method of controlling a brushless permanent-magnet motor, the method comprising commutating a winding of the motor at times that are retarded relative to zero-crossings of back EMF in the winding, dividing each half of an electrical cycle into a conduction period followed by a primary freewheel period, dividing the conduction period into a first excitation period, a secondary freewheel period, and a second excitation period, exciting a winding of the motor during each excitation period, and freewheeling the winding during each freewheel period.

For a permanent-magnet motor, the torque-to-current ratio is at a maximum when the waveform of the phase current matches that of the back EMF Improvements in the efficiency of the motor are therefore achieved by shaping the waveform of the phase current such that it better matches the waveform of the back EMF. During excitation, the phase current may rise faster than the back EMF at around the zero-crossings in the back EMF. Consequently, if the winding were commutated in advance of or in synchrony with the zero-crossings, the phase current would quickly lead the back EMF. By retarding commutation until after each zero-crossing in the back EMF, the rise in the phase current may be made to more closely follow that of the back EMF. As a result, the efficiency of the motor may be improved.

Although commutation is retarded, the phase current may nevertheless rise at a faster rate than that of the back EMF. As a result, the phase current may eventually lead the back EMF. The secondary freewheel period serves to check momentarily the rise in the phase current. Consequently, the phase current may be made to more closely follow the rise of the back EMF during the conduction period, thereby further improving the efficiency.

The secondary freewheel period may occur at a time when the back EMF in the winding is rising, and the primary freewheel period may occur at a time when back EMF is principally falling. The primary freewheel period makes use of the inductance of the winding such that torque continues to be generated by the phase current without any additional power being drawn from the power supply. As the back EMF falls, less torque is generated for a given phase current. Accordingly, by freewheeling the winding during the period of falling back EMF, the efficiency of the motor may be improved without adversely affecting the torque.

The length of the secondary freewheel period may be less than each of the primary freewheel period, the first excitation period and the second excitation period. Consequently, the secondary freewheel period acts to check momentarily the rise of the phase current without adversely affecting the power of the motor.

The method may comprise exciting the winding with a supply voltage, and varying the length of the conduction period in response to changes in the supply voltage and/or the speed of the motor. As a result, better control may be achieved over the power of the motor.

As the supply voltage decreases, less current and thus less power are driven into the motor over the same conduction period. Equally, as the speed of the motor increases, the magnitude of the back EMF induced in the winding increases. Less current and thus less power are then driven into the motor over the same conduction period. Accordingly, in order to compensate for this, the method may comprise increasing the conduction period in response to a decrease in the supply voltage and/or an increase in the speed of the motor.

Changes in the magnitude of the supply voltage used to excite the winding will influence the rate at which the phase current rises. Changes in the speed of the motor will influence the length of each electrical half-cycle and thus the rate at which the back EMF rises. Additionally, changes in the speed of the motor will influence the magnitude of the back EMF and thus the rate at which the phase current rises. Accordingly, the method may comprise retarding commutation by a retard period, and varying the retard period in response to changes in the supply voltage and/or the speed of the motor. This then has the advantage that the efficiency of the motor may be improved as the motor operates over a range of supply voltages and/or motor speeds. Additionally, the amount of current and thus power that is driven into the winding is sensitive to changes in the supply voltage and/or the motor speed. By varying the retard period in response to changes in the supply voltage and/or motor speed, better control may be achieved over the input or output power of the motor.

The method may comprise increasing the retard period in response to an increase in the supply voltage and/or a decrease in the motor speed. As the magnitude of the supply voltage increases, the phase current rises at a faster rate. As the speed of the motor decreases, the back EMF rises at a slower rate. Additionally, the magnitude of the back EMF decreases and thus the phase current rises at a faster rate. By increasing the retard period in response to an increase in the supply voltage and/or a decrease in the motor speed, the waveform of the phase current may be made to better match that of the back EMF in response to changes in the supply voltage and/or the motor speed. As a result, the efficiency of the motor may be improved when operating over a range of supply voltages and/or speeds.

The method may comprise controlling the motor in the manner described in any one of the preceding paragraphs when operating at speeds greater than 50 krpm. At this relatively high speed, the length of each electrical half-cycle is relatively short and the magnitude of the back EMF is relatively large. Both of these factors would suggest that advanced commutation is necessary in order to drive sufficient current and thus power into the phase winding in order to maintain such speeds. Indeed, it is likely that advanced commutation is necessary in order to accelerate to such speeds. Nevertheless, the applicant has identified that once at these speeds, commutation may be retarded so as to improve the efficiency of the motor.

The method may comprise controlling the motor in the manner described in any one of the preceding paragraphs when operating over a speed range that spans at least 5 krpm, and more preferably at least 10 krpm. As a result, improvements in the efficiency of the motor may be achieved over a relatively large speed range.

The present invention still further provides a control circuit configured to perform a method described in any one of the preceding paragraphs, as well as a motor assembly that comprises the control circuit and a brushless permanent-magnet motor.

The control circuit may comprise an inverter for coupling to a winding of the motor, a gate driver module and a controller. The gate driver module then controls switches of the inverter in response to control signals received from the controller. The controller generates control signals for commutating the winding at times that are retarded relative to zero-crossings of back EMF in the winding. The controller is also responsible for dividing each half of an electrical cycle into the conduction period and the primary freewheel period, and for dividing the conduction period into the first excitation period, the secondary freewheel period, and the second excitation period. The controller then generates control signals to excite the winding during each excitation period and to freewheel the winding during each freewheel period.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

Figure 1:
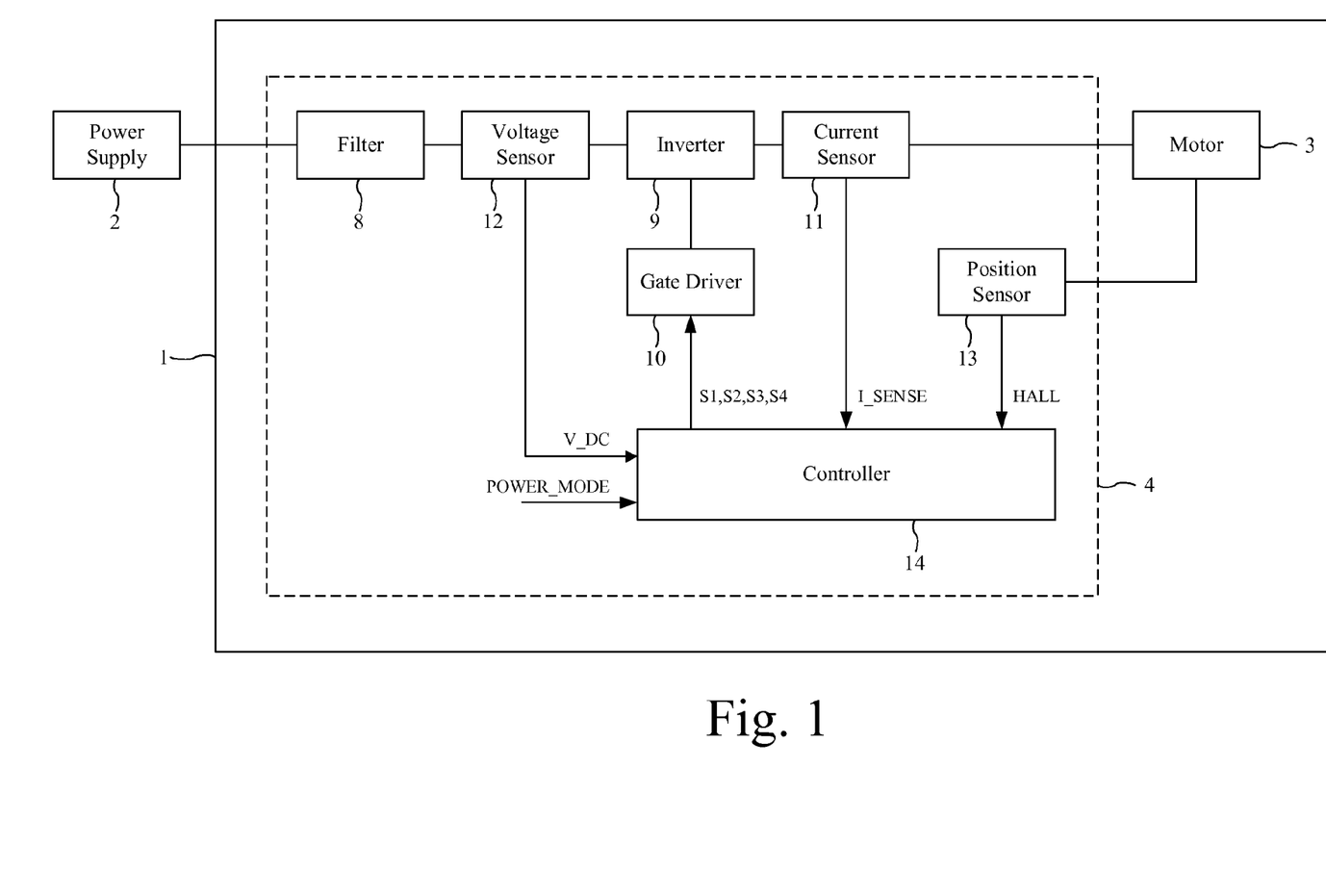
FIG. 1 is a block diagram of a motor assembly in accordance with the present invention.
Figure 2:
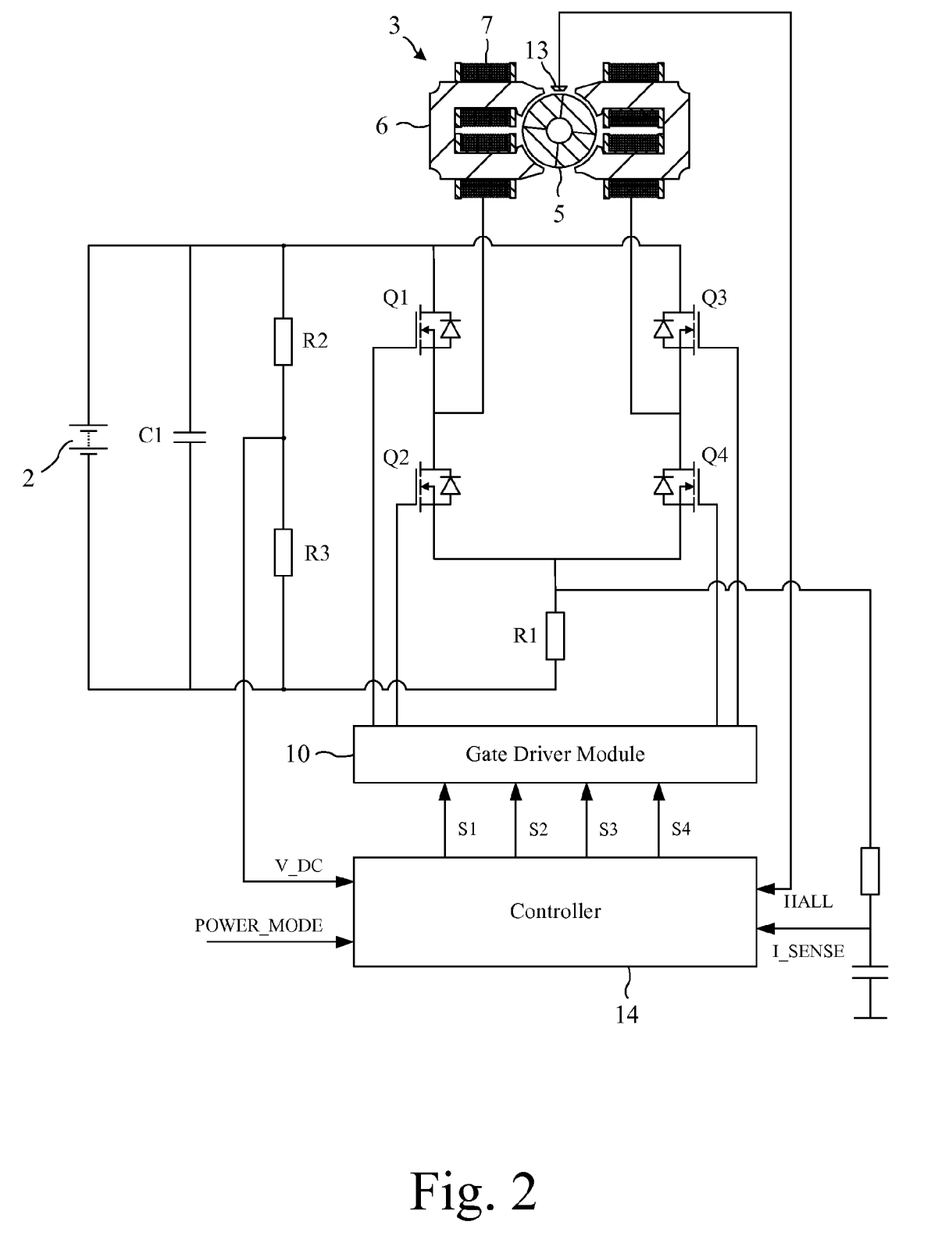
FIG. 2 is a schematic diagram of the motor assembly.

The motor assembly 1 of FIGS. 1 and 2 is powered by a DC power supply 2 and comprises a brushless motor 3 and a control circuit 4.

The motor 3 comprises a four-pole permanent-magnet rotor 5 that rotates relative to a four-pole stator 6. Conductive wires wound about the stator 6 are coupled together to form a single phase winding 7.

The control circuit 4 comprises a filter 8, an inverter 9, a gate driver module 10, a current sensor 11, a voltage sensor 12, a position sensor 13, and a controller 14.

The filter 8 comprises a link capacitor C1 that smoothes the relatively high-frequency ripple that arises from switching of the inverter 9.

The inverter 9 comprises a full bridge of four power switches Q1-Q4 that couple the phase winding 7 to the voltage rails. Each of the switches Q1-Q4 includes a freewheel diode.

The gate driver module 10 drives the opening and closing of the switches Q1-Q4 in response to control signals received from the controller 14.

The current sensor 11 comprises a shunt resistor R1 located between the inverter and the zero-volt rail. The voltage across the current sensor 11 provides a measure of the current in the phase winding 7 when connected to the power supply 2. The voltage across the current sensor 11 is output to the controller 14 as signal, I_PHASE.

The voltage sensor 12 comprises a potential divider R2,R3 located between the DC voltage rail and the zero volt rail. The voltage sensor outputs a signal, V_DC, to the controller 14 that represents a scaled-down measure of the supply voltage provided by the power supply 2.

The position sensor 13 comprises a Hall-effect sensor located in a slot opening of the stator 6. The sensor 13 outputs a digital signal, HALL, that is logically high or low depending on the direction of magnetic flux through the sensor 13. The HALL signal therefore provides a measure of the angular position of the rotor 5.

The controller 14 comprises a microcontroller having a processor, a memory device, and a plurality of peripherals (e.g. ADC, comparators, timers etc.). The memory device stores instructions for execution by the processor, as well as control parameters and lookup tables that are employed by the processor during operation of the motor assembly 1. The controller 14 is responsible for controlling the operation of the motor 3 and generates four control signals S1-S4 for controlling each of the four power switches Q1-Q4. The control signals are output to the gate driver module 10, which in response drives the opening and closing of the switches Q1-Q4.

Figure 3:
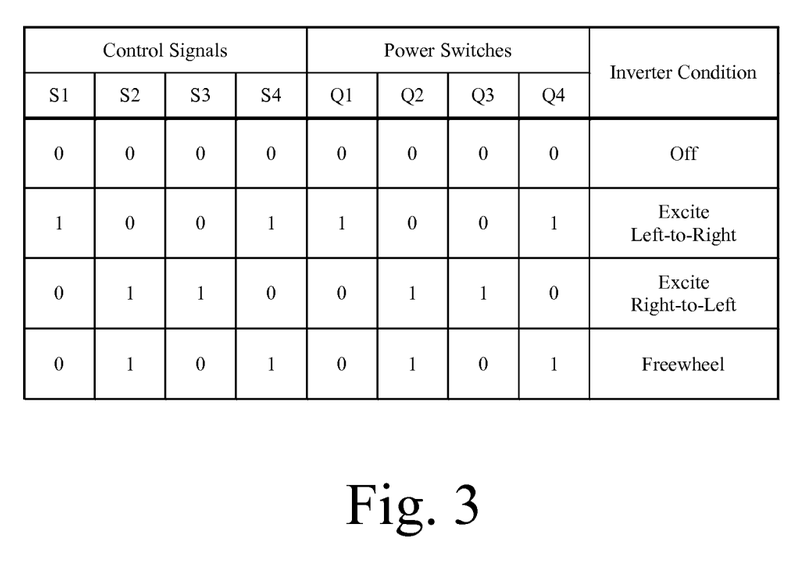
FIG. 3 details the allowed states of the inverter in response to control signals issued by the controller of the motor assembly.

FIG. 3 summarises the allowed states of the switches Q1-Q4 in response to the control signals S1-S4 output by the controller 14. Hereafter, the terms 'set' and 'clear' will be used to indicate that a signal has been pulled logically high and low respectively. As can be seen from FIG. 3, the controller 14 sets S1 and S4, and clears S2 and S3 in order to excite the phase winding 7 from left to right. Conversely, the controller 14 sets S2 and S3, and clears S1 and S4 in order to excite the phase winding 7 from right to left. The controller 14 clears S1 and S3, and sets S2 and S4 in order to freewheel the phase winding 7. Freewheeling enables current in phase the winding 7 to re-circulate around the low-side loop of the inverter 9. In the present embodiment, the power switches Q1-Q4 are capable of conducting in both directions. Accordingly, the controller 14 closes both low-side switches Q2,Q4 during freewheeling such that current flows through the switches Q2,Q4 rather than the less efficient diodes. Conceivably, the inverter 9 may comprise power switches that conduct in a single direction only. In this instance, the controller 14 would clear S1, S2 and S3, and set S4 so as to freewheel the phase winding 7 from left to right. The controller 14 would then clear S1, S3 and S4, and set S2 in order to freewheel the phase winding 7 from right to left. Current in the low-side loop of the inverter 9 then flows down through the closed low-side switch (e.g. Q4) and up through the diode of the open low-side switch (e.g. Q2).

The controller 14 operates in one of three modes: acceleration mode, low-power mode and high-power mode. Low-power mode and high-power mode are both steady-state modes. The controller 14 receives and periodically monitors a power-mode signal, POWER_MODE, in order to determine which steady-state mode should be employed. If the power-mode signal is logically low, the controller 14 selects low-power mode, and if the power-mode signal is logically high, the controller 14 selects high-power mode. When operating in low-power mode, the controller 14 drives the motor 3 over an operating speed range of 60-70 krpm. When operating in high-power mode, the controller 14 drives the motor 3 over an operating speed range of 90-100 krpm. Acceleration mode is then used to accelerate the motor 3 from stationary to the lower limit of each operating speed range.

In all three modes the controller 14 commutates the phase winding 7 in response to edges of the HALL signal. Each HALL edge corresponds to a change in the polarity of the rotor 5, and thus a change in the polarity of the back EMF induced in the phase winding 7. More particularly, each HALL edge corresponds to a zero-crossing in the back EMF. Commutation involves reversing the direction of current through the phase winding 7. Consequently, if current is flowing through the phase winding 7 in a direction from left to right, commutation involves exiting the winding from right to left.

In the discussion below, reference is made frequently to the speed of the motor 3. The speed of the motor 3 is determined from the interval between successive edges of the HALL signal, which will hereafter be referred to as the HALL period.

Acceleration Mode

At speeds below 20 krpm, the controller 14 commutates the phase winding 7 in synchrony with each HALL edge. At speeds at or above 20 krpm, the controller 14 commutates the phase winding 7 in advance of each HALL edge. In order to commutate the phase winding 7 in advance of a particular HALL edge, the controller 14 acts in response to the preceding HALL edge. In response to the preceding HALL edge, the controller 14 subtracts an advance period, T_ADV, from the HALL period, T_HALL, in order to obtain a commutation period, T_COM:

$$T\_COM = T\_HALL - T\_ADV$$

The controller 14 then commutates the phase winding 7 at a time, T_COM, after the preceding HALL edge. As a result, the controller 14 commutates the phase winding 7 in advance of the subsequent HALL edge by the advance period, T_ADV.

Irrespective of whether commutation in synchronous or advanced, the controller 14 sequentially excites and freewheels the phase winding 7 over each half of an electrical cycle when operating in acceleration mode. More particularly, the controller 14 excites the phase winding 7, monitors the current signal, I_PHASE, and freewheels the phase winding 7 when the current in the phase winding 7 exceeds a predefined limit. Freewheeling then continues for a predefined freewheel period during which time current in the phase winding 7 falls to a level below the current limit. At the end of the freewheel period the controller 14 again excites the phase winding 7. This process of exciting and freewheeling the phase winding 7 continues over the full length of the electrical half-cycle. The controller 14 therefore switches from excitation to freewheeling multiple times during each electrical half-cycle.

Figure 4:
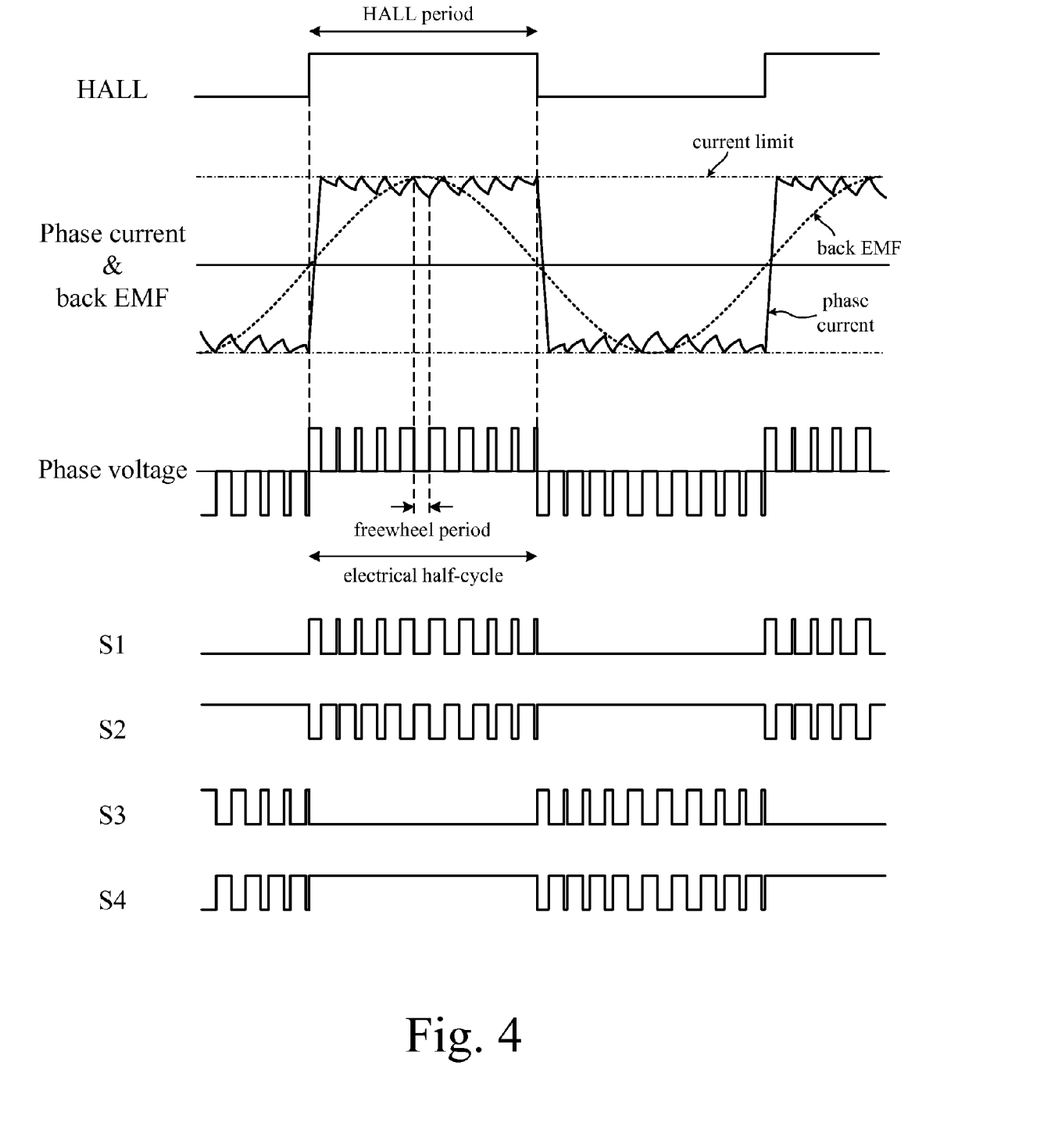
FIG. 4 illustrates various waveforms of the motor assembly when operating in acceleration mode.

FIG. 4 illustrates the waveforms of the HALL signal, the back EMF, the phase current, the phase voltage, and the control signals over a couple of HALL periods when operating in acceleration mode. In FIG. 4 the phase winding 7 is commutated in synchrony with the HALL edges.

At relatively low speeds, the magnitude of the back EMF induced in the phase winding 7 is relatively small. Current in the phase winding 7 therefore rises relatively quickly during excitation, and falls relatively slowly during freewheeling. Additionally, the length of each HALL period and thus the length of each electrical half-cycle is relatively long. Consequently, the frequency at which the controller 14 switches from excitation to freewheeling is relatively high. However, as the rotor speed increases, the magnitude of the back EMF increases and thus current rises at a slower rate during excitation and falls at a quicker rate during freewheeling. Additionally, the length of each electrical half-cycle decreases. As a result, the frequency of switching decreases.

The controller 14 continues to operate in acceleration mode until the speed of the rotor 5 reaches the lower limit of the operating speed range of the selected power mode. So, for example, if high-power mode is selected, the controller 14 continues to operate in acceleration mode until the speed of the rotor 5 reaches 90 krpm.

High-Power Mode

The controller 14 commutates the phase winding in advance of each HALL edge. Advanced commutation is achieved in the same manner as that described above for acceleration mode.

When operating in high-power mode, the controller 14 divides each half of an electrical cycle into a conduction period followed by a freewheel period. The controller 14 then excites the phase winding 7 during the conduction period and freewheels the phase winding 7 during the freewheel period. The phase current is not expected to exceed the current limit during excitation. Consequently, the controller 14 switches from excitation to freewheeling only once during each electrical half-cycle.

The controller 14 excites the phase winding 7 for a conduction period, T_CD. At the end of the conduction period, the controller 14 freewheels the phase winding 7. Freewheeling then continues indefinitely until such time as the controller 14 commutates the phase winding 7. The controller 14 therefore controls operation of the motor 3 using two parameters: the advance period, T_ADV, and the conduction period, T_CD.

Figure 5:
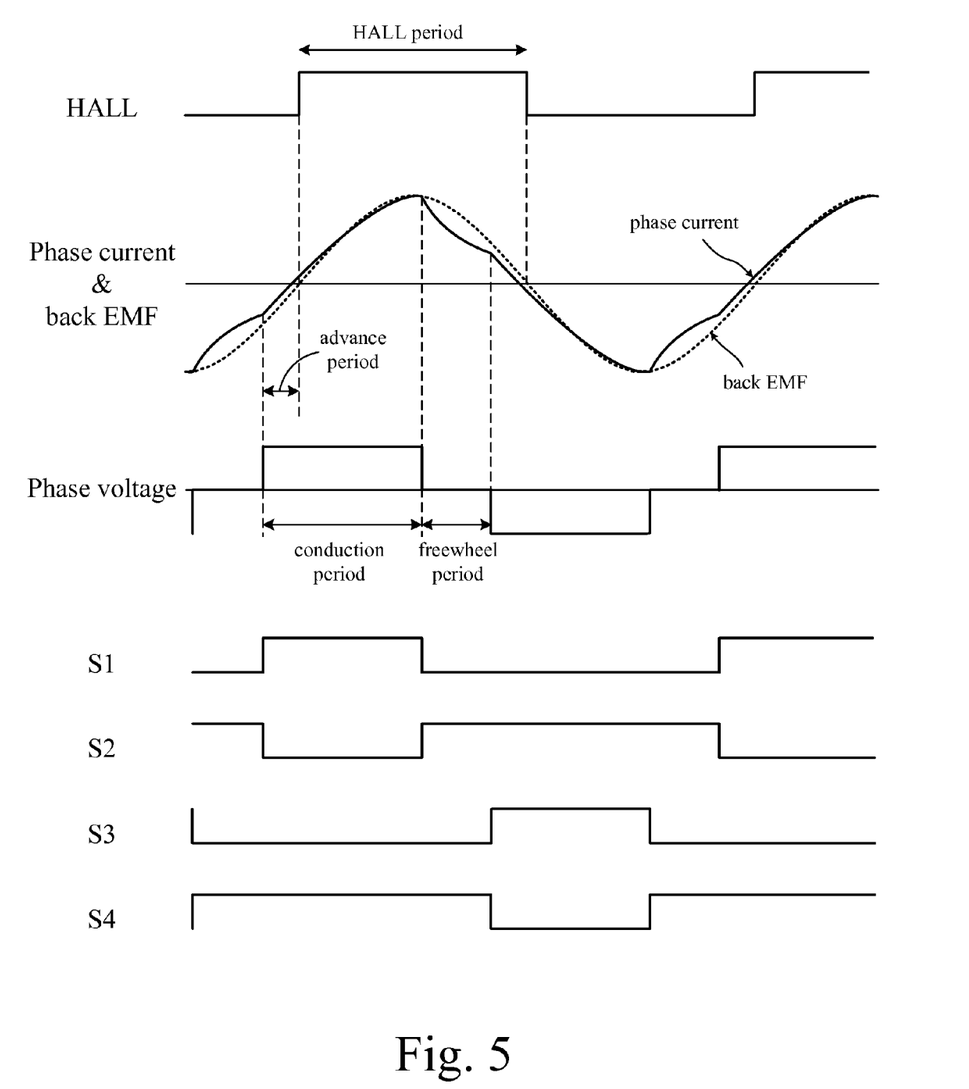
FIG. 5 illustrates various waveforms of the motor assembly when operating in high-power mode.

FIG. 5 illustrates the waveforms of the HALL signal, the back EMF, the phase current, the phase voltage, and the control signals over a couple of HALL periods when operating in high-power mode.

The magnitude of the supply voltage used to excite the phase winding 7 may vary. For example, the power supply 2 may comprise a battery that discharges with use. Alternatively, the power supply 2 may comprise an AC source, rectifier and smoothing capacitor that provide a relatively smooth voltage, but the RMS voltage of the AC source may vary. Changes in the magnitude of the supply voltage will influence the amount of current that is driven into the phase winding 7 during the conduction period. As a result, the power of the motor 3 is sensitive to changes in the supply voltage. In addition to the supply voltage, the power of the motor 3 is sensitive to changes in the speed of the rotor 5. As the speed of the rotor 5 varies (e.g. in response to changes in load), so too does the magnitude of the back EMF. Consequently, the amount of current driven into the phase winding 7 during the conduction period may vary. The controller 14 therefore varies the advance period and the conduction period in response to changes in the magnitude of the supply voltage. The controller 14 also varies the advance period in response to changes in the speed of the rotor 5.

The controller 14 stores a voltage lookup table that comprises an advance period, T_ADV, and a conduction period, T_CD, for each of a plurality of different supply voltages. The controller 14 also stores a speed lookup table that comprises a speed-compensation value for each of a plurality of different rotor speeds and different supply voltages. The lookup tables store values that achieve a particular input or output power at each voltage and speed point. In the present embodiment, the lookup tables store values that achieve constant output power for the motor 3 over a range of supply voltages as well as over the operating speed range for high-power mode.

The V_DC signal output by the voltage sensor 12 provides a measure of the supply voltage, whilst the length of the HALL period provides a measure of the rotor speed. The controller 14 indexes the voltage lookup table using the supply voltage to select a phase period and a conduction period. The controller 14 then indexes the speed lookup table using the rotor speed and the supply voltage to select a speed-compensation value. The controller 14 then adds the selected speed-compensation value to the selected phase period so as to obtain a speed-compensated phase period. The commutation period, T_COM, is then obtained by subtracting the speed-compensated phase period from the HALL period, T_HALL.

The speed lookup table stores speed-compensation values that depend not only on the speed of the rotor 5 but also on the magnitude of the supply voltage. The reason for this is that, as the supply voltage decreases, a particular speed-compensation value has a smaller net effect on the output power of the motor 3. By storing speed-compensation values that depend on both the rotor speed and the supply voltage, better control over the output power of the motor 3 may be achieved in response to changes in the rotor speed.

It will be noted that two lookup tables are used to determine the advance period. The first lookup table (i.e. the voltage lookup table) is indexed using the supply voltage. The second lookup table (i.e. the speed lookup table) is indexed using both the rotor speed and the supply voltage. Since the second lookup table is indexed using both rotor speed and supply voltage, one might question the need for two lookup tables. However, the advantage of using two lookup tables is that different voltage resolutions may be used. The output power of the motor 3 is relatively sensitive to the magnitude of the supply voltage. In contrast, the effect that the speed-compensation value has on the output power is less sensitive to the supply voltage. Accordingly, by employing two lookup tables, a finer voltage resolution may be used for the voltage lookup table, and coarser voltage resolution may be used for the speed lookup table. As a result, relatively good control over the output power of the motor 3 may be achieved through the use of smaller lookup tables, which then reduces the memory requirements of the controller 14.

Low-Power Mode

The controller 14 commutates the phase winding 7 at times that are retarded relative to the HALL edges. Retarded commutation is achieved in a manner similar to that for advanced commutation. In response to a HALL edge, the controller 14 adds a retard period, T_RET, to the HALL period, T_HALL, in order to obtain a commutation period, T_COM:

$$T\_COM = T\_HALL + T\_RET$$

The controller 14 then commutates the phase winding 7 at a time, T_COM, after the HALL edge. As a result, the controller 14 commutates the phase winding 7 at a time T_RET after the subsequent HALL edge.

When operating in low-power mode, the controller 14 divides each half of an electrical cycle into a conduction period followed by a primary freewheel period. The controller 14 then divides the conduction period into a first excitation period, followed by a secondary freewheel period, followed by a second excitation period. The controller 14 then excites the phase winding 7 during each of the two excitation periods and freewheels the phase winding 7 during each of the two freewheel periods. As in high-power mode, the phase current is not expected to exceed the current limit during excitation. Accordingly, the controller 14 switches from excitation to freewheeling twice during each electrical half-cycle.

Figure 6:
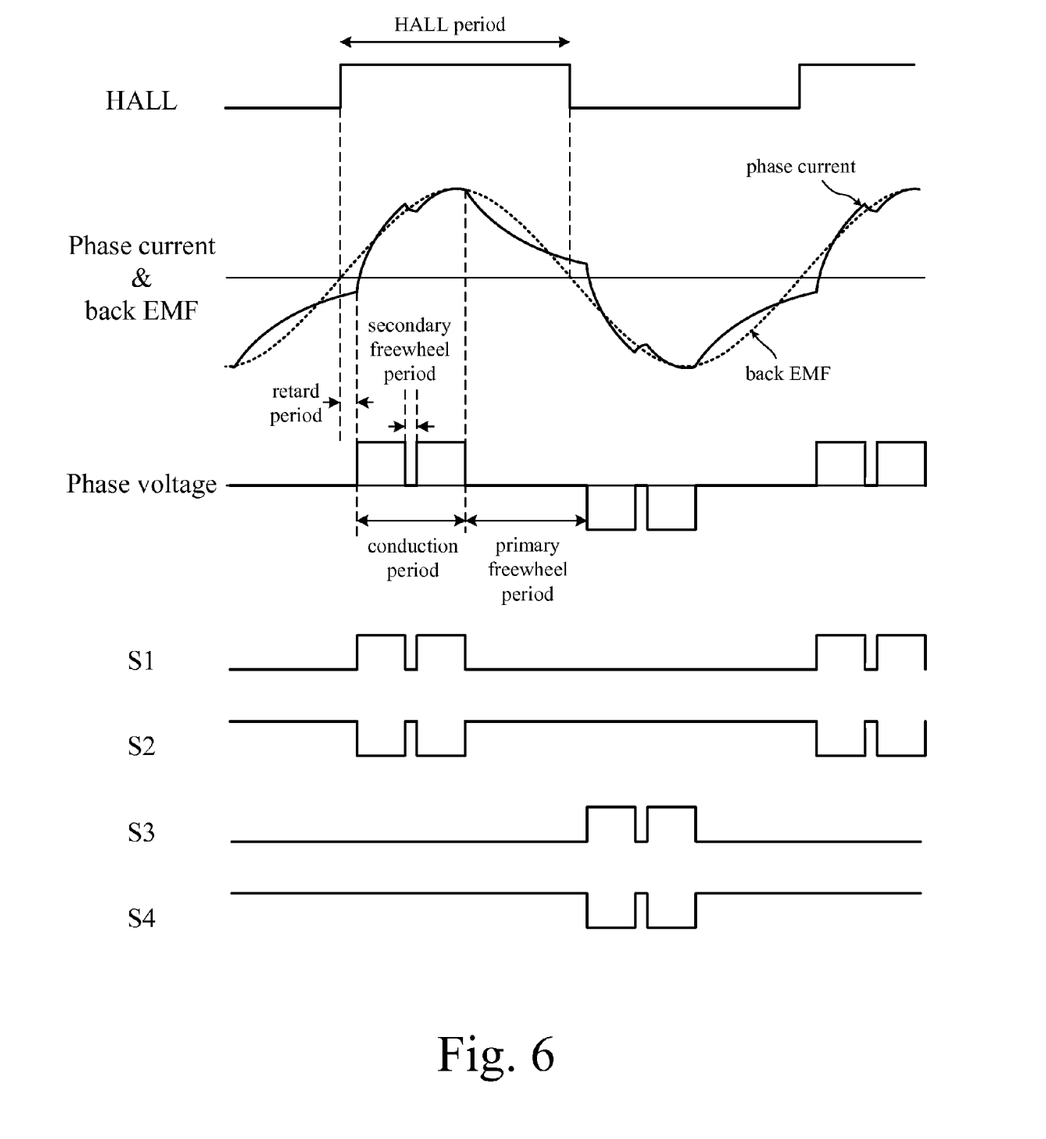
FIG. 6 illustrates various waveforms of the motor assembly when operating in low-power mode.

FIG. 6 illustrates the waveforms of the HALL signal, the back EMF, the phase current, the phase voltage, and the control signals over a couple of HALL periods when operating in low-power mode.

As in high-power mode, the controller 14 varies the retard period and the conduction period in response to changes in the magnitude of the supply voltage, and the controller 14 varies the retard period in response to changes in the speed of the rotor 5. The controller 14 therefore stores a further voltage lookup table that comprises different retard periods, T_RET, and different excitation periods, T_EXC, for different supply voltages. The controller 14 also stores a further speed lookup table that comprises speed-compensation values for different rotor speeds and different supply voltages. The lookup tables employed in low-power mode therefore differ from those employed in high-power mode only in that tables store retard periods rather than advance periods, and excitation periods rather than conduction periods. As in high-power mode, the lookup tables employed in low-power mode store values that achieve constant output power for the motor 3 over the same range of supply voltages and over the operating speed range for low-power mode.

During operation, the controller 14 indexes the voltage lookup table using the supply voltage to select a retard period and an excitation period. The selected excitation period is then used to define both the first excitation period and the second excitation period, i.e. during the conduction period the controller 14 excites the phase winding 7 for the selected excitation period, freewheels the phase winding 7 for the secondary freewheel period, and excites the phase winding 7 again for the selected excitation period. As a result, the secondary freewheel period occurs at the centre of the conduction period.

In comparison to high-power mode, the excitation of the phase winding 7 differs in two important ways. First, the controller 14 retards commutation. Second, the controller 14 introduces a secondary freewheel period into the conduction period. The reasons for and benefits of these two differences will now be explained.

When operating in high-power mode, advanced commutation is necessary in order to achieve the necessary output power. As the speed of the rotor 5 increases, the HALL period decreases and thus the time constant (L/R) associated with the phase inductance becomes increasingly important. Additionally, the back EMF induced in the phase winding 7 increases, which in turn influences the rate at which phase current rises. It therefore becomes increasingly difficult to drive current and thus power into the phase winding 7. By commutating the phase winding 7 in advance of each HALL edge, and thus in advance of the zero-crossings in the back EMF, the supply voltage is boosted momentarily by the back EMF. As a result, the direction of current through the phase winding 7 is more quickly reversed. Additionally, the phase current is caused to lead the back EMF, which helps to compensate for the slower rate of current rise. Although this then generates a short period of negative torque, this is normally more than compensated by the subsequent gain in positive torque.

When operating in low-power mode, the length of the HALL period is longer and thus the back EMF rises at a slower rate. Additionally, the magnitude of the back EMF is lower and thus current in the phase winding 7 rises at a faster rate for a given supply voltage. The back EMF therefore rises at a slower rate but the phase current rises at a faster rate. It is not therefore necessary to commutate the phase winding 7 in advance of the HALL edges in order to achieve the desired output power. Moreover, for reasons that will now be explained, the efficiency of the motor assembly 3 is improved by retarding commutation.

During excitation, the torque-to-current ratio is at a maximum when the waveform of the phase current matches that of the back EMF. Improvements in the efficiency of the motor 3 are therefore achieved by shaping the waveform of the phase current such that it better matches the waveform of the back EMF, i.e. by reducing the harmonic content of the phase current waveform relative to the back EMF waveform. As noted in the preceding paragraph, when operating in low-power mode, the back EMF rises at a slower rate but the phase current rises at a faster rate. Indeed, when operating in low-power mode, the phase current rises faster than the back EMF when the magnitude of the back EMF is relatively low, i.e. at around zero-crossings in the back EMF. Consequently, if the phase winding 7 were commutated in advance of or in synchrony with the HALL edges, the phase current would quickly lead the back EMF. In high-power mode, it was necessary for the phase current to initially lead the back EMF in order to compensate for the shorter HALL period and the slower rise in the phase current. In low-power mode, however, it is not necessary for the phase current to lead the back EMF in order to achieve the necessary output power. By retarding commutation until after each HALL edge, the phase current more closely follows the rise in the back EMF. As a result, the efficiency of the motor assembly 1 is improved.

The secondary freewheel period acts to further improve the efficiency of the motor 3. As a result of retarding commutation, the phase current more closely matches that of the back EMF. Nevertheless, the phase current continues to rise at a faster rate than that of the back EMF. Consequently, the phase current eventually overtakes the back EMF. By introducing a relatively small secondary freewheel period into the conduction period, the rise in the phase current is checked momentarily such that the rise in the phase current more closely follows the rise in the back EMF. As a result, the harmonic content of the phase current waveform relative to the back EMF waveform is further reduced and thus the efficiency of the motor 3 is further increased.

Acceleration mode is used to accelerate the motor 3 from stationary to the lower limit of each operating speed range. Consequently, the controller 14 operates in acceleration mode between 0 and 90 krpm when high-power mode is selected, and between 0 and 60 krpm when low-power mode is selected. Irrespective of which power mode has been selected, the controller 14 commutates the phase winding 7 in synchrony with the HALL edges between 0 and 20 krpm. The controller 14 then commutates the phase winding 7 in advance of the HALL edges as the motor 3 accelerates from 20 to 90 krpm (high-power mode) or from 20 to 60 krpm (low-power mode). When operating in acceleration mode, the controller 14 employs an advance period that remains fixed as the rotor 5 accelerates. Irrespective of whether high-power mode or low-power mode is selected, the controller 14 indexes the voltage lookup table employed in high-power mode using the supply voltage in order to select an advance period. The selected advance period is then used by the controller 14 during acceleration mode. Conceivably, the efficiency of the motor 3 may be improved by employing an advance period that varies with rotor speed. However, this would then require an additional lookup table. Moreover, acceleration mode is typically short-lived, with the controller 14 operating predominantly in low-power mode or high-power mode. Consequently, any efficiency improvements that may be made by varying the advance period within acceleration mode are unlikely to contribute significantly to the overall efficiency of the motor 3.

On switching from acceleration mode to low-power mode, the controller 14 switches from advanced commutation to retarded commutation. When operating within the low-power mode, the controller 14 is able to drive sufficient current and thus power into the phase winding 7 during each electrical half-cycle whilst simultaneously employing retarded commutation in order to improve the efficiency of the motor assembly 1. In contrast, during acceleration, advanced commutation is necessary in order to ensure that sufficient current and thus power is driven into the phase winding 7 during each electrical half-cycle. If the controller 14 were to retard or synchronise commutation during acceleration, the rotor 5 would fail to accelerate to the required speed. Accordingly, whilst retarded commutation may be employed in order to maintain the rotor speed over a speed range of 60-70 krpm, advanced commutation is necessary in order to ensure that the rotor accelerates to 60 krpm.

Whilst it is known to retard commutation when operating at relatively low speeds, it is completely unknown to retard commutation when operating at relatively high speeds, i.e. at speeds in excess of 50 krpm. At these relatively high speeds, the relatively short length of each HALL period and the magnitude of the back EMF would suggest that advanced commutation is necessary. Indeed, advanced commutation is necessary in order to accelerate the motor to such speeds. The applicant has, however, identified that once at these speeds, commutation may be retarded so as to improve the efficiency of the motor 3.

In the embodiment described above, the controller 14 employs two steady-state modes: high-power mode and low-power mode. In high-power mode, the controller 14 commutates the phase winding 7 in advance of zero-crossings in the back EMF. In low-power mode, the controller 14 commutates the phase winding 7 in retard of zero-crossings in the back EMF. The advance period and the retard period may each be regarded as a phase period, T_PHASE, and the commutation period, T_COM may be defined as:

$$T\_COM = T\_HALL - T\_PHASE$$

If the phase period is positive, commutation occurs before the HALL edge (i.e. advanced commutation), and if the phase period is negative, commutation occurs after the HALL edge (i.e. retarded commutation). Employing the same scheme to commutate the phase winding 7 in both high-power mode and low-power mode simplifies the control. However, conceivably different methods may be used to commutate the phase winding 7. For example, when operating in low power mode, the controller 14 may simply commutate the phase winding 7 at a time, T_RET, after each HALL edge.

In the embodiment described above, the controller 14 varies only the phase period (i.e. the advance period in high-power mode and the retard period in low-power mode) in response to changes in the rotor speed. In comparison to the conduction period, the input power of the motor 3 is typically more sensitive to changes in the phase period. Accordingly, better control over the output power of the motor 3 may be achieved by varying the phase period. Nevertheless, in spite of these advantages, the controller 14 may instead vary only the conduction period in response to changes in the rotor speed. Alternatively, the controller 14 may vary both the phase period and the conduction period in response to changes in the rotor speed. This may be necessary if, for example, the output power of the motor 3 cannot be controlled adequately by varying just the phase period. Alternatively, improvements in the efficiency of the motor 3 may be achieved by varying both the phase period and the conduction period in response to changes in the rotor speed. However, a disadvantage of varying both the phase period and the conduction period is that additional lookup tables are required, thus placing additional demands on the memory of the controller 14.

In the embodiment described above, the controller 14 varies the phase period and the conduction period in response to changes in the supply voltage. This then has the advantage that the efficiency of the motor 3 may be better optimised at each voltage point. Nevertheless, it may be possible to achieve the desired control over the output power of the motor 3 by varying just one of the phase period and the conduction period. Since the output power of the motor 3 is more sensitive to changes in the phase period, better control over the output power of the motor 3 may be achieved by varying the phase period.

The controller 14 may therefore be said to vary the phase period and/or the conduction period in response to changes in the supply voltage and the rotor speed. Whilst the two periods may be varied in response to changes in the supply voltage and the rotor speed, the controller 14 could conceivably vary the periods in response to only one of the supply voltage and the rotor speed. For example, the voltage provided by the power supply 2 may be relatively stable. In the instance, the controller 14 might vary the phase period and/or the conduction period in response to changes in the rotor speed only. Alternatively the motor 3 may be required to operate at constant speed or over a relatively small range of speeds within low-power mode and high-power mode. In this instance, the controller 14 might vary the phase period and/or the conduction period in response to changes in the supply voltage only. Accordingly, in a more general sense, the controller 14 may be said to vary the phase period and/or the conduction period in response to changes in the supply voltage and/or the rotor speed. Moreover, rather than storing a voltage lookup table or a speed lookup table, the controller 14 may be said to store a power lookup table that comprises different control values for different supply voltages and/or rotor speeds. Each control value then achieves a particular output power at each voltage and/or speed point. The controller 14 then indexes the power lookup table using the supply voltage and/or the rotor speed to select a control value from the power lookup table. The control value is then used to define the phase period or the conduction period.

In the embodiment described above, the controller 14 stores lookup tables that comprises conduction periods for use in high-power mode and excitation periods for use in low-power mode. However, the same level of control may be achieved by different means. For example, rather than storing a lookup table of conduction periods and excitation periods, the controller 14 could store a lookup table of primary freewheel periods, which is likewise indexed using the magnitude of the supply voltage and/or the speed of the rotor 5. The conduction period would then be obtained by subtracting the primary freewheel period from the HALL period, and each excitation period would be obtained by subtracting the primary and the secondary freewheel periods from the HALL period and dividing the result by two:

$$T\_CD = T\_HALL - T\_FW\_1$$

$$T\_EXC = (T\_HALL - T\_FW\_1 - T\_FW\_2)/2$$

where T_CD is the conduction period, T_EXC is each of the first and second excitation periods, T_HALL is the HALL period, T_FW_1 is the primary freewheel period, and T_FW_2 is the secondary freewheel period.

In the embodiment described above, the secondary freewheel period occurs at the very centre of the conduction period. This is achieved by ensuring that the same excitation period is used to define the lengths of the first excitation period and the second excitation period. There are at least two advantages in ensuring that the secondary freewheel period occurs at the centre of the conduction period. First, the harmonic content of the phase current is better balanced over the two excitation periods. As a result, the total harmonic content of the phase current over the conduction period is likely to be lower than if the two excitation periods were of different lengths. Second, the lookup table need only store one excitation period for each voltage point. As a result, less memory is required for the lookup table. In spite of the aforementioned advantages, it may be desirable to alter the position of the secondary freewheel period in response to changes in the supply voltage and/or the rotor speed. This may be achieved by employing a lookup table that stores a first excitation period and a second excitation period for different voltages and/or speeds.

The controller 14 employs a secondary freewheel period that is fixed in length. This then has the advantage of reducing the memory requirements of the controller 14. Alternatively, however, the controller 14 might employ a secondary freewheel period that varies in response to changes in the supply voltage and/or the rotor speed. In particular, the controller 14 may employ a secondary freewheel period that increases in response to an increase in the supply voltage or a decrease in the rotor speed. As the supply voltage increases, current in the phase winding 7 rises at a faster rate during excitation, assuming that the rotor speed and thus the magnitude of the back EMF is unchanged. As a result, the harmonic content of the phase current waveform relative to the back EMF waveform is likely to increase. By increasing the length of the secondary freewheel period in response to an increase in the supply voltage, the rise in the phase current is checked for a longer period and thus the harmonic content of the phase current waveform may be reduced. As the rotor speed decreases, the length of the HALL period increases and thus the back EMF rises at a slower rate. Additionally, the magnitude of the back EMF decreases and thus current in the phase winding 7 rises at a faster rate, assuming that the supply voltage is unchanged.

Consequently, as the rotor speed decreases, the back EMF rises at a slower rate but the phase current rises at a faster rate. The harmonic content of the phase current waveform relative to the back EMF waveform is therefore likely to increase. By increasing the secondary freewheel period in response to a decrease in the rotor speed, the rise in the phase current is checked for a longer period and thus the harmonic content of the phase current waveform may be reduced. Accordingly, increasing the secondary freewheel period in response to an increase in the supply voltage and/or a decrease in the rotor speed may result in further improvements in efficiency.

The length of the secondary freewheel period is relatively short and is intended only to check momentarily the rise in the phase current. Accordingly, the secondary freewheel period is shorter than both the primary freewheel period and each of the excitation periods. The actual length of the secondary freewheel period will depend upon the particular characteristics of the motor assembly 1, e.g. the inductance of the phase winding 7, the magnitude of the supply voltage, the magnitude of the back EMF etc. Irrespective of the length, the secondary freewheel period occurs during a period of rising back EMF in the phase winding 7. This is contrast to the primary freewheel period, which occurs principally if not wholly during a period of falling back EMF. The primary freewheel period makes use of the inductance of the phase winding 7 such that torque continues to be generated by the phase current without any additional power being drawn from the power supply 2. As the back EMF falls, less torque is generated for a given phase current. Accordingly, by freewheeling the phase winding 7 during the period of falling back EMF, the efficiency of the motor assembly 1 may be improved without adversely affecting the torque.

The invention claimed is:

1. A method of controlling a brushless permanent-magnet motor, the method comprising commutating a winding of the motor at times that are retarded relative to zero-crossings of back EMF in the winding when operating at speeds greater than 50 krpm.

2. The method of claim 1, wherein the method comprises commutating the winding at times that are retarded relative to zero-crossings of back EMF when operating over a speed range spanning at least 5 krpm.

3. The method of claim 1, wherein the method comprising commutating the winding at times that are retarded relative to zero-crossings of back EMF in the winding by a retard period, and varying the retard period in response to changes in a supply voltage used to excite the winding or the speed of the motor.

4. The method of claim 3, wherein the method comprises increasing the retard period in response to increase in the supply voltage or a decrease in the speed of the motor.

5. The method of claim 1, wherein the method comprises dividing each electrical half-cycle into a conduction period followed by a freewheel period, the winding being excited during the conduction period and freewheeled during the freewheel period.

6. The method of claim 5, wherein the method comprises dividing the conduction period into a first excitation period, a further freewheel period and a second excitation period, the winding is excited during each excitation period and the winding is freewheeled during the further freewheel period.

7. The method of claim 1, wherein the method comprises commutating the winding at times that are retarded relative to zero-crossings of back EMF when operating over a first speed range, commutating the winding at times that are advanced relative to zero-crossings of back EMF in the winding when operating over a second speed range, and the second speed range is higher than the first speed range.

8. The method of claim 7, wherein the method comprises dividing each electrical half-cycle of the motor into a conduction period followed by a freewheel period when operating over the first speed range and the second speed range, the winding being excited during the conduction period and freewheeled during the freewheel period.

9. The method of claim 7, wherein the method comprises driving the motor at constant power over the first speed range and driving the motor at a higher constant power over the second speed range.

10. The method of claim 7, wherein the first speed range and the second speed range each span at least 5 krpm.

11. A control circuit for a brushless permanent-magnet motor, the control circuit being configured to commutate a winding of the motor at times that are retarded relative to zero-crossings of back EMF in the winding when operating at speeds greater than 50 krpm.

12. The control circuit of claim 11, wherein the control circuit is included in a motor assembly for a brushless permanent-magnet motor.

13. A method of controlling a brushless permanent-magnet motor, the method comprising:
commutating a winding of the motor at times that are retarded relative to zero-crossings of back EMF in the winding;
dividing each half of an electrical cycle into a conduction period followed by a primary freewheel period;
dividing the conduction period into a first excitation period, a secondary freewheel period, and a second excitation period;
exciting a winding of the motor during each excitation period; and
freewheeling the winding during each freewheel period.

14. The method of claim 13, wherein the secondary freewheel period occurs at a time when back EMF in the winding is rising, and the primary freewheel period occurs at a time when back EMF is principally falling.

15. The method of claim 13, wherein the length of the secondary freewheel period is less than each of the primary freewheel period, the first excitation period and the second excitation period.

16. The method of claim 13, wherein the method comprises exciting the winding with a supply voltage, and varying the length of the conduction period in response to changes in the supply voltage or the speed of the motor.

17. The method of claim 16, wherein the method comprises increasing the length of the conduction period in response to a decrease in the supply voltage or an increase in the speed of the motor.

18. The method of claim 13, wherein the method comprising commutating the winding at times that are retarded relative to zero-crossings of back EMF in the winding by a retard period, exciting the winding with a supply voltage, and varying the length of the retard period in response to changes in the supply voltage or the speed of the motor.

19. The method of claim 18, wherein the method comprises increasing the retard period in response to increase in the supply voltage or a decrease in the speed of the motor.

20. The method of claim 13, wherein the method comprises commutating the winding at times that are retarded relative to zero-crossings of back EMF, dividing each half of an electrical cycle into the conduction period and primary freewheel period, and dividing the conduction period into the first excitation period, the secondary freewheel period, and the second excitation period when operating at speeds greater than 50 krpm.

21. The method of claim 13, wherein the method comprises commutating the winding at times that are retarded relative to zero-crossings of back EMF, dividing each half of an electrical cycle into the conduction period and primary freewheel period, and dividing the conduction period into the first excitation period, the secondary freewheel period, and the second excitation period when operating over a speed range that spans at least 5 krpm.

22. The method of claim 21, wherein the method comprises driving the motor at constant power over the speed range.

23. A control circuit for a brushless permanent-magnet motor, the control circuit being configured to: commutate a winding of the motor at times that are retarded relative to zero-crossings of back EMF in the winding; divide each half of an electrical cycle into a conduction period followed by a primary freewheel period; divide the conduction period into a first excitation period, a secondary freewheel period, and a second excitation period; excite a winding of the motor during each excitation period; and freewheel the winding during each freewheel period.

24. The control circuit of claim 23, wherein the control circuit is included in a motor assembly for a brushless permanent-magnet motor.

* * * * *